United States Patent

[11] 3,627,977

| [72] | Inventor | Bernard J. Aldenhoff<br>Oconomowoc, Wis. |
|---|---|---|
| [21] | Appl. No. | 876,446 |
| [22] | Filed | Nov. 13, 1969 |
| [45] | Patented | Dec. 14, 1971 |
| [73] | Assignee | A. O. Smith Corporation<br>Milwaukee, Wis. |

[54] ARC POWER SOURCE
7 Claims, 1 Drawing Fig.

[52] U.S. Cl..................................... 219/131 F,
219/130, 219/135
[51] Int. Cl...................................... B23k 9/10
[50] Field of Search............................. 219/137,
135, 131, 130

[56] References Cited
UNITED STATES PATENTS

| 2,110,436 | 3/1938 | Candy | 219/131 X |
| 2,189,606 | 2/1940 | King | 219/131 X |
| 2,364,372 | 12/1944 | Kenrick | 219/131 X |
| 2,449,456 | 9/1948 | Croco et al. | 219/131 X |
| 2,769,118 | 10/1956 | Lester | 219/131 X |
| 3,048,693 | 8/1962 | Adamson et al. | 219/131 |
| 3,210,523 | 10/1965 | Cotter et al. | 219/131 |

*Primary Examiner*—J. V. Truhe
*Assistant Examiner*—George A. Montanye
*Attorney*—Andrus, Sceales, Starke & Sawall ABSTRACT: A touch start apparatus initiates and stops the welding arc in a consumable arc-welding process. The electrode touching the workpiece energizes a starting coil connected in series with a single-phase, full-wave rectifier and a diode in parallel with the welding supply and closes a reed switch to connect the power supply to the welding process. Welding current through a second coil normally maintains the switch closed and back-biases the diode to effectively open the starting circuitry. The starting coil has a capacitor in parallel with the coil and provides a holding current to the coil and holds the switch closed during the starting transition and after the opening of the starting circuitry.

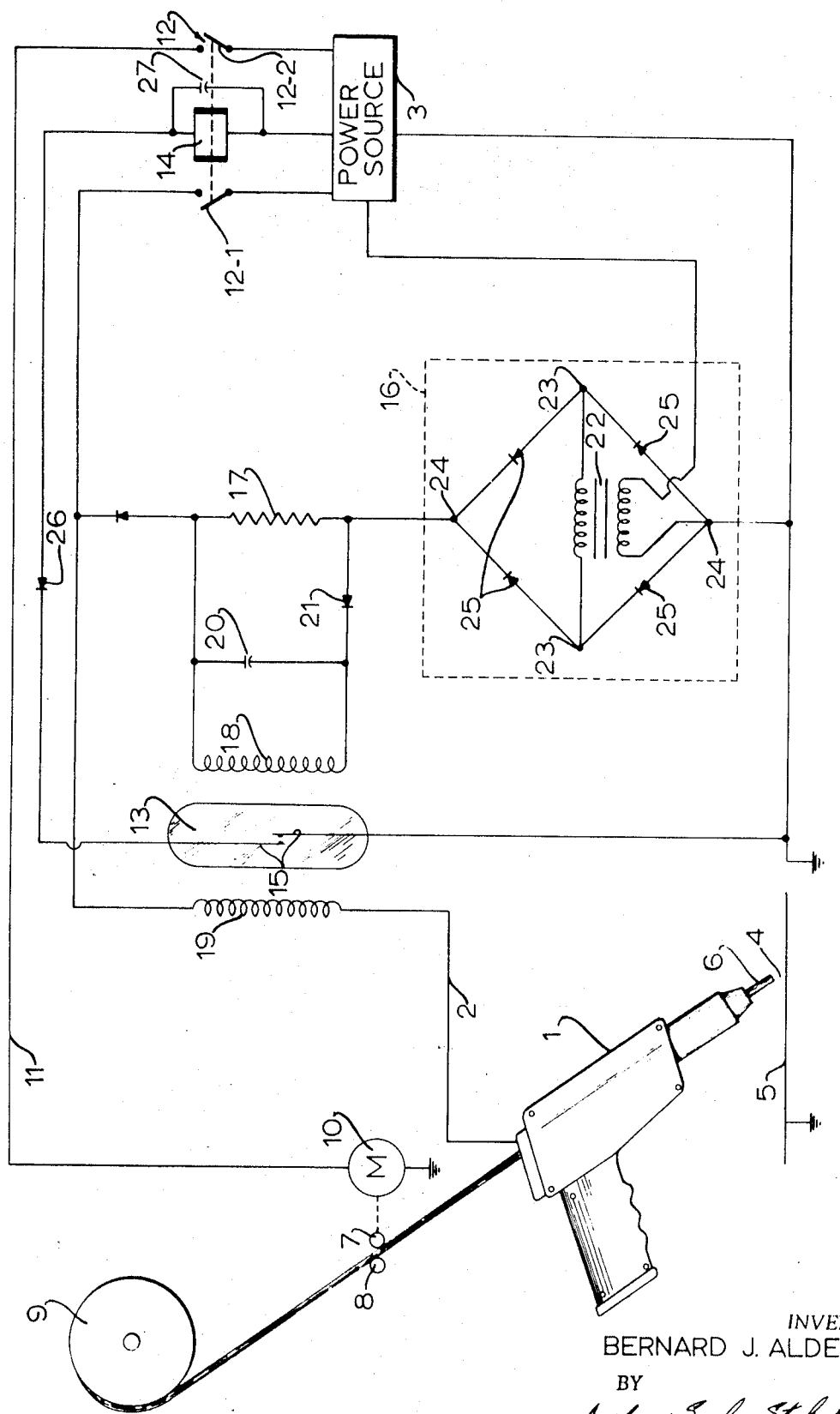
INVENTOR.
BERNARD J. ALDENHOFF

3,627,977

ARC POWER SOURCE

BACKGROUND OF INVENTION

This invention relates to a touch start apparatus for an arc source or the like to control energization of the the welding equipment.

In the past, initiation of a welding process employing a hand-manipulated weld gun and the like has generally been accomplished through the use of a hand-operated trigger switch which would activate the power supply to provide welding current to the electrodes and power to associated equipment, such as a consumable electrode drive motor, a coolant supply, a gas source, or the like. An operator may close the trigger switch prematurely while too far from the workpiece or hold the trigger closed after removal from the workpiece, thereby feeding an excessive electrode wire length from the gun prior to establishment and after termination of an arc. The unfused electrode protruding from the workpiece may create a safety hazard, and the removal is not only time consuming, but expensive. Further, the hand-operated trigger switch must be held closed and the constant pressure required therefor often cramps the muscles or tendons in the operator's hand, thereby impairing efficient operation.

SUMMARY OF THE INVENTION

In accordance with the present invention, the welding process is controlled by the relative positioning of the electrode and the workpiece and eliminates the need for a hand-operated trigger switch. Generally, the welding control circuit is responsive to the operator's placing the electrode into contact with the workpiece to initiate welding and to removal of the electrode to terminate welding. Thus, as the electrode touches the workpiece, welding current is automatically applied to form an arc and power is simultaneously applied to the associated equipment, such as an electrode drive mechanism to feed a consumable electrode to the weld arc.

The control circuit of this invention employs a magnetically responsive switch, such as a reed to activate the welding supply; preferably through a suitable relay-coupling circuit. The switch is induced to close by a magnetic field produced by a starting circuit responsive to the electrode engaging the work and is continuously held closed during normal operation by a magnetic field produced by the welding current passing through the welding line to the arc.

The starting circuit is placed across the welding line and includes a low-voltage source in series with a coil coupled to the switch. When the electrode comes into contact with the workpiece establishing a low-impedance path, the coil is energized and actuates a switching means to supply arc power.

As welding current beings to flow, the resultant magnetic fields of both the starting coil and the line affect the switch means in an additive manner. As the arc forms and the current increases toward a normal operating level, the welding line voltage back-biases the starting circuit and thereby cuts out or effectively disconnects the DC source. When back-bias is first reached, the magnetic field produced by the welding current may not be strong enough to independently hold the reed switch in a closed position.

To prevent the reed switch from opening and disconnecting the power supply at starting, a capacitor is placed in parallel to the starting coil and is charged from the DC source while starting current flow. THe capacitor discharges through the starting coil after back-biasing has occurred, and conjointly with the welding current field holds the switch in a closed condition to allow time for the welding current to reach an appropriate level to independently hold the switch. When the capacitor has completely discharged, the back-biased starting circuit becomes completely inactive while the welding current continues to hold the switch in a closed position.

Upon completion of the welding process, the operator deenergizes the system by separating the electrode from the workpiece, thereby breaking the arc. The flow of welding current thus ceases causing the switch to open which deenergizes the control circuit and disconnects the power source from the arc line, and resetting the circuit to the original status within the starting circuit in condition to establish a cycle when the electrode is brought into contact with the workpiece.

It is thus apparent that the present invention eliminates the possibility of an electrode protruding from the workpiece and also eliminates the need for a manually operated trigger switch. Another important feature of this invention occurs should the weld current drop abnormally during operation. In such a situation, the current drop will cause the switch to open and thereby stop the feed of consumable electrode and terminate the arc, thereby drawing the operator's attention to the malfunction.

BRIEF DESCRIPTION OF THE DRAWING

The drawing furnished herewith illustrates the best mode presently contemplated by the inventor and clearly discloses the above advantages and features as well as others which will be readily understood from the detailed description thereof.

The drawing is a schematic view of a welding circuit including a control circuit constructed in accordance with the present invention.

DESCRIPTION OF THE PREFERRED EMBODIMENT

Referring to the drawing, the illustrated embodiment of the invention shows a welding gun 1 which is powered through welding lines 2 from a power source 3, thereby producing a welding arc 4 when gun 1 is properly positioned with respect to a grounded workpiece 5 and welding current is sufficiently applied.

Welding gun 1 is of any suitable variety and utilizes a consumable electrode 6 which is fed to the arc 4 by suitable known means. The illustrated consumable electrode 6 is fed by friction drive rolls 7 and 8 from a reel 9 to maintain the arc 4 established between the electrode 6 and workpiece 5 by current derived from power source 3 through welding lines 2. Roll 7 is operably coupled to adjustable-speed motor 10 which is connected via line 11 and a ground to power source 3.

Welding gun 1 may have other suitable accessories not shown, such as to provide coolant, shielding gas, or whatever else may be needed in the welding process.

Normally open relay contacts 12-1 and 12-2 of a relay 12 are connected within lines 2 and 11, respectively, and selectively connect the power source 3 to gun 1 upon closing thereof.

A magnetically actuated switch 13 is employed to control energization of a relay winding 14 of relay 12 and thereby the closing of the associated relay contacts 12-1 and 12-2. Switch 13 is shown as a known reed switch comprising a gas-filled tubular envelope having flexible magnetizable contact reeds 15 sealed into either end. The inner ends of the reeds overlap to define contacts which are normally open and close only when the reeds are excited by an appropriate magnetic field.

A starting circuit is employed to initially close the contacts of reed switch 13 and thereby start the welding process in which a low-voltage DC source 16 is connected in series with a resistor 17 and paralleled starting coil 18 across the welding lines 2 and thus across the arc terminals and electrodes. Initially, with electrode 6 spaced from workpiece 5, welding lines 2 are open circuited by contact 12-1 and current is prevented from flowing through starting coil 18 and resistor 17 from DC source 16. However, when the operator wishes to weld, welding electrode 6 is brought in contact with workpiece 5 and current flows from the DC source 16 through coil 18 and resistor 17 to the engaging electrode 6 and workpiece 5 back to source 16. Coil 18 is positioned adjacent reed switch 13 such that the magnetic field produced by the current flow through coil 18 is impressed upon the reed switch 13. The coil 18 and reeds 15 are oriented such that the field causes the overlapped ends to be attracted and the switch moved into a closed position.

As stated previously, closing of reed switch 13 will activate relay winding 14 which in turn will close switches 12-1 and 12-2, thereby supplying current to electrode 6 through line 2 and to motor 10 through line 11. Thus, arc 4 is formed, and consumable electrode 6 will start feeding through welding gun 2 to the weld area instantaneously and simultaneously whenever electrode 6 touches workpiece 5.

Welding current flowing in lines 2 will also create a magnetic field about the electromagnetic coupling portion 19 of welding line 2 which is properly positioned to couple the field to reed switch 13 in such a manner to be additive to the magnetic field produced by coil 18, thereby continuing to maintain reed switch 13 in a closed position.

During welding operation, the voltage on welding line 2 will back-bias DC source 16 and prevent current from flowing through starting coil 18 from DC source 16. At the moment back-biasing occurs, welding current in welding line 2 may not have increased enough to produce a magnetic field sufficient to maintain reed switch 13 in a closed position. Since the starting circuit is back biased and the welding current has not reached a sufficient level, reed switch 13 would open and deactivate relay winding 14 thereby opening relay contacts 12-1 and 12-2 which will stop the welding process. The whole cycle will then start over again if electrode 6 remains in contact with workpiece 5 which would result in a continual cyclic start and stop sequence, quite unsatisfactory to normal welding operation. To remedy this, a holding capacitor 20 is connected in parallel with coil 18 and charges when current flows from DC source 16 during the starting sequence. When voltage on welding line 2 back-biases DC source 16, capacitor 20 will discharge through coil 18 to maintain, with the line-related field, a sufficient magnetic field to hold reed switch 13 in a closed position. The discharge of capacitor 20 normally takes approximately one-eighth second which allows the welding current in welding line 2 to reach a sufficient level to independently maintain reed switch 13 is a closed position.

A blocking diode 21 is placed in series between resistor 17 and capacitor 20 such that capacitor 20 discharges only through coil 18, thereby producing the desired magnetic field about reed switch 13.

DC source 16 may consist of may suitable low-voltage source of a level somewhat below the normal arc voltage. The embodiment shows a full-wave, single-phase diode rectifier which receives alternating current from the main power source 3. A stepdown transformer 22 is connected to source 3 and to input terminals 23 to provide the desired voltage level. Direct current is produced at output terminals 24 by the full wave rectification produced in accordance with the usual bridge arrangement of diodes 25.

The present invention may utilize either alternating current or direct current in the welding operation. In the event that alternating current is utilized, the magnetic field produced by the electromagnetic coupling portion of the welding line 19 will alternate in relationship to the varying current.

The reed switch 13 will correspondingly close and open twice per cycle. Diode 26 rectifies the control alternating current so that unidirectional pulses are fed in every other half cycle to the main control relay winding 14. A capacitor 27, connected across relay winding 14, is charged by the pulses and discharges between pulses to continually energize relay 12 and hold contacts 12-1 and 12-2 is a closed position.

In order to stop the welding process, the operator simply removes electrode 6 from the close proximity of workpiece 5, thereby stopping arc 4 and opening the circuit. Welding current in line 2 thus ceases eliminating the corresponding magnetic field effect over reed switch 13 and the back-biasing effect upon DC source 16. The open switch 13 deenergizes main control relay winding 14 to open the associated relay contacts 12-1 and 12-2, thereby disconnecting the power source from the welding lines 2. The starting circuit is thus reset to start another welding cycle whenever electrode 6 is brought into contact with workpiece 5. Although not shown in the present embodiment, main control relay winding 14 may also be utilized to control other relays thereby connecting other devices used in the welding process to the power supply, such as gas supplied to the arc, or coolant supplied to the welding gun.

The present invention provides a highly satisfactory and reliable start control for use in a welding process.

We claim:

1. A control circuit to selectively control a welding power source connected to output welding leads connected to a pair of electrode means conducting welding current to establish and maintain an arc between said electrode means and provide a welding operation in response to the positioning of a welding electrode in close proximity to a workpiece, wherein the improvement comprises an electromagnetic coupling means connected in series in said welding leads and conducting said welding current to produce a magnetic field proportional to the magnitude of said welding current in said leads, a magnetically responsive switching means disposed adjacent said coupling means and having contacts in said magnetic field and at least one of said contacts being moved by said magnetic field and selectively connecting at least one of said leads to said power source, a starting circuit means including a low-voltage direct current source connected in series with a coil to said leads to establish a low-voltage direct starting current when said electrode is positioned in close proximity to said workpiece, said coil providing a starting magnetic field separate from said welding magnetic field and proportional to the magnitude of said starting current flowing through said coil, said coil mounted adjacent said switching means to locate said contacts in said starting magnetic field to move said contacts and actuate the switching means to connect said power source to said leads and welding magnetic field and said starting magnetic field conjointly and simultaneously being impressed on said contacts for a selected time to positively actuate said contacts and said welding magnetic field holding said switching means actuated to maintain the connection between said power source and said leads, and a consumable electrode drive motor to move at least one of said electrode means into said arc and selectively connected to said power source by said switching means in response to actuation of said contacts to provide instantaneous electrode feed upon establishing an arc and to instantaneously cease the electrode feed upon extinguishing the arc.

2. A control circuit to selectively control a welding power source connected to output welding leads connected to a pair of electrode means conducting welding current to establish and maintain an arc between said electrode means and provide a welding operation in response to the positioning of a welding electrode in close proximity to a workpiece, wherein the improvement comprises an electromagnetic coupling means connected in series in said welding leads and conducting said welding current to produce a magnetic field proportional to the magnitude of said welding current in said leads, a magnetically responsive switching means disposed adjacent said coupling means and in said magnetic field and selectively connecting at least one of said leads to said power source, a starting circuit means including a low-voltage direct current source connected in series with a coil to said leads to establish a low-voltage direct starting current when said electrode is positioned in close proximity to said workpiece and a back-bias means connected for back-biasing said direct current source during welding current flow to interrupt the direct current flow from said direct current source to said coil, said coil providing a starting magnetic field separate from said welding magnetic field and proportional to the magnitude of said starting current flowing through said coil, said coil mounted adjacent said switching means to locate said switching means in said starting magnetic field to actuate the switching means to connect said power source to said leads and said welding magnetic field holding said switching means actuated to maintain the connection between said power source and said leads.

3. The circuit of claim 2, wherein said starting circuit means further includes a holding means for supplying a current to said coil for a timed duration after said direct current source has been back biased.

4. The circuit of claim 2, wherein said back-bias means includes a diode means connected in series with said direct current source and said coil for interrupting the flow of starting current to said welding leads during welding current flow.

5. A control circuit to selectively control a welding power source connected to output welding leads connected to a pair of electrode means conducting welding current to establish and maintain an arc between said electrode means and provide a welding operation in response to the positioning of a welding electrode in close proximity to a workpiece, wherein the improvement comprises
   an electromagnetic coupling means connected in series in said welding leads and conducting said welding current to produce a magnetic field proportional to the magnitude of said welding current in said leads,
   a magnetically responsive switching means disposed adjacent said coupling means and in said magnetic field and selectively connecting at least one of said leads to said power source,
   a starting circuit means including a low-voltage direct current source connected in series with a coil to said leads and further including a capacitor and resistor parallel connected to said coil and a diode serially connected between said resistor and capacitor to establish a low-voltage direct starting current when said electrode is positioned in close proximity to said workpiece, said coil providing a starting magnetic field separate from said welding magnetic field and proportional to the magnitude of said starting current flowing through said coil, said coil mounted adjacent said switching means to locate said switching means in said starting magnetic field to actuate the switching means connect said power source to said leads and said welding magnetic field holding said switching means actuated to maintain the connection between said power source and said leads.

6. A control circuit to selectively control a welding power source connected to output welding leads connected to a pair of electrode means conducting welding current to establish and maintain an arc between said electrode means and provide a welding operation in response to the positioning of a welding electrode in close proximity to a workpiece, wherein the improvement comprises
   an electromagnetic coupling means connected in series in said welding leads and conducting said welding current to produce a magnetic field proportional to the magnitude of said welding current in said leads,
   a magnetically responsive switching means including a parallel-connected relay coil and capacitor connected in series to a diode and a reed switch disposed adjacent said coupling means and in said magnetic field and selectively connecting means and at least one of said leads to said power source,
   a starting circuit means including a low-voltage direct current source connected in series with a coil to said leads to establish a low-voltage direct starting current when said electrode is positioned in close proximity to said workpiece, said coil providing a starting magnetic field separate from said welding magnetic field and proportional to the magnitude of said starting current flowing through said coil, said coil mounted adjacent said switching means to locate said switching means in said starting magnetic field, said relay coil selectively energized according to the actuation of said reed switch by said starting and welding magnetic fields and providing a set of contacts to selectively connect said welding leads to said power source and said welding magnetic field holding said switching means actuated to maintain the connection between said power source and said leads.

7. A control circuit to selectively control a welding power source connected to output welding leads connected to a pair of electrode means conducting welding current to establish and maintain an arc between said electrode means and provide a welding operation in response to the positioning of a welding electrode in close proximity to a workpiece, wherein the improvement comprises
   a power control switching means including a normally open reed switch serially connected to a first diode and a parallel-connected first capacitor and main control relay having a plurality of contacts for connecting said power source to said electrode means,
   a starting means connected to said welding leads and including a low-voltage direct current source serially connected to a diode and a parallel-connected resistor, coil and second capacitor, and a second diode serially connected to said resistor and said second capacitor for providing a low-voltage direct starting current to said coil when said electrode is positioned in close proximity to said workpiece, said coil mounted adjacent said reed switch and providing a starting magnetic field when conducting said starting current to actuate said reed switch into a closed condition to energize said main control relay and supply welding current to said electrode means through said welding leads, said welding current back-biasing said starting means to interrupt the flow of direct current from said direct current source to said coil and said capacitor providing a holding current to said coil for a short duration after said starting means is back-biased to provide continued energization of said reed switch and allow said welding current to reach normal operating levels, and
   an electromagnetic coupling means connected in series in said welding leads and conducting said welding current to produce a welding magnetic field, said coupling means mounted adjacent said reed switch so that said welding magnetic field will hold said reed switch in a closed condition.

* * * * *

UNITED STATES PATENT OFFICE
CERTIFICATE OF CORRECTION

Patent No. 3,627,977          Dated December 14, 1971

Inventor(s) BERNARD J. ALDENHOFF

It is certified that error appears in the above-identified patent and that said Letters Patent are hereby corrected as shown below:

Column 1, line 52, cancel "beings" and insert --- begin ---;

Column 3, line 37, cancel "is" and insert --- in ---;

Column 3, line 42, cancel "may" (second occurrence) and insert --- any ---;

Column 3, line 63, cancel "is" and insert --- in ---;

Column 4, line 35, before "welding" insert --- said ---;

Column 5, line 42, after "means" insert --- to ---;

Column 6, line 3, after "connecting" cancel "means and".

Signed and sealed this 4th day of July 1972.

(SEAL)
Attest:

EDWARD M. FLETCHER, JR.          ROBERT GOTTSCHALK
Attesting Officer          Commissioner of Patents